United States Patent [19]

Fukushima et al.

[11] Patent Number: 5,063,458
[45] Date of Patent: Nov. 5, 1991

[54] ELECTRONIC STILL CAMERA WITH STANDBY SWITCHES OPERABLE TO ENABLE THE CAMERA FOR RECORDING AN IMAGE UPON ACTUATION OF A RECORDING SWITCH

[75] Inventors: Takashi Fukushima, Tokyo; Takashi Hishinuma, Kanagawa, both of Japan

[73] Assignee: Sony Corporation, Tokyo, Japan

[21] Appl. No.: 407,742

[22] Filed: Sep. 15, 1989

[30] Foreign Application Priority Data

Sep. 27, 1988 [JP] Japan .................................. 63-241594

[51] Int. Cl.$^5$ .............................................. H04N 5/781
[52] U.S. Cl. ...................................... 358/335; 358/909
[58] Field of Search ...................... 358/335, 906, 909; 360/35.1

[56] References Cited

U.S. PATENT DOCUMENTS 4,531,164   7/1985   Maeda et al. .................. 358/906 X Primary Examiner—Robert L. Richardson
Attorney, Agent, or Firm—Alvin Sinderbrand; William S. Frommer

[57] ABSTRACT

An electronic camera of the type having an image pick up for generating electrical image signals representing a received optical image, a recorder responsive to a record control signal for recording the image signals on a magnetic medium, and a shutter release operable to carry out a recording operation whereby the image signals are recorded. A standby switch, separate from and operable independently of the shutter release, functions to condition the recorder to carry out the recording operation upon subsequent operation of the shutter release. A separate recording switch is actuated by the shutter release for causing a record control signal to be supplied to the conditioned recorder, whereby image signals are recorded on the magnetic medium.

4 Claims, 4 Drawing Sheets

ELECTRONIC STILL CAMERA WITH STANDBY SWITCHES OPERABLE TO ENABLE THE CAMERA FOR RECORDING AN IMAGE UPON ACTUATION OF A RECORDING SWITCH

BACKGROUND OF THE INVENTION

1. Field of the Invention

This invention relates to an electronic camera for magnetically recording still image signals and, more particularly, to such a camera that is conditioned to carry out a recording operation just prior to performing the operation itself, thereby minimizing power consumption during long periods when such conditioning is not necessary.

2. Description of the Prior Art

So-called electronic still cameras have been introduced in which video signals are generated in response to a sensed image and recorded on a magnetic medium, such as a miniaturized floppy disk. Video picture signals produced when the recorded video signals are played back, may be displayed on a monitor, such as a conventional television receiver, or may be "printed" to form a "hard copy" image corresponding thereto.

To effect a magnetic recording of the image signals, the floppy disk or other magnetic medium must be moved past a magnetic transducer, or head. Typically, the magnetic medium is rotated by a spindle which, in turn, is driven by a spindle drive motor. When compared to the power consumption of the various solid state circuits included in the camera, the spindle drive motor exhibits relatively high power consumption. Furthermore, since the motor is a mechanical device with measurable inertia, a period of time is needed from the moment that the motor is supplied with energy until it reaches a satisfactory rotary speed suitable for the magnetic recording of image signals.

Electronic cameras which have been proposed heretofore normally are provided with a main power on/off switch. When this switch is OFF, operating energy is not supplied to the various drive motors and circuits included in the camera. However, even when the switch is ON, it may not be necessary to supply operating energy to those drive motors or to the image pick up elements and the signal recording circuitry unless and until a picture taking operation (which, in an electronic camera is more accurately referred to as a recording operation) actually is carried out. To energize the motors long before an image is to be recorded is an unnecessary consumption of power. Since the preferred source of energy for an electronic camera is a battery, it is important not to deplete that battery unnecessarily. Consequently, during quiescent, or standby modes of the camera, energy normally is not supplied to the drive motors or to many of the camera circuits even though main on/off switch is ON.

One proposal to conserve energy in an electronic camera of the forementioned type is described in Japanese laid open patent application No. 58-33370 (filed as Japanese application 56-131933). In that proposed camera, two separate switches are actuated in sequence so as to: (1) first initialize the drive motors, pick up elements and recording circuitry—that is, first supply operating energy to those motors to bring them up to speed and apply power to the pick up elements and recording circuitry; and then (2) execute an image recording operation. The latter operation is performed by reading out one field or frame of electrical image signals produced by a suitable sensor, such as a CCD sensor, in response to an optical image projected thereto, and magnetically recording the field or frame of signals.

Typically, the separate switches are sequentially operated by a single operating element which, when normally actuated by a user, moves to first and second positions corresponding to the aforementioned initializing and recording operations. When the operating element moves to its first position, the camera is initialized and thus made ready to record images signals; and when the operating element moves to its second position, the image signals are recorded. Thus, energy is not unnecessarily supplied to power consuming elements and devices until the operating element moves to its first position even though the main power on/off switch may be ON.

Although, this arrangement minimizes power consumption, it suffers from a significant disadvantage and drawback. Usually, the operating element is constructed as a spring-biased shutter release button. When that button is partially depressed, corresponding to the aforementioned first position, the camera is initialized. When that button is fully depressed, corresponding to the aforementioned second position, the image recording operation is carried out. In many instances, then, while the user is composing a "picture" to be recorded, he will partially depress the shutter release button to be ready to record a desired image instantly. However, there is a fine distinction between the partially and fully depressed positions of the shutter release button. In attempting merely to depress the shutter release button partially, the user may inadvertently depress that button fully. Still further, even when the user successfully locates the partially depressed position of the shutter release button, a suitable force nevertheless must be exerted to maintain the button in that position. This could be tiresome. But to reduce the force necessary to maintain the shutter release button partially depressed may result in the unintentional release of that button, thus de-initializing the camera. Consequently, the user may miss a desirable photographic opportunity because the camera may no longer be initialized for recording.

OBJECT AND SUMMARY OF THE INVENTION

Therefore, it is an object of the present invention to avoid the aforenoted disadvantageous attending earlier proposals of electronic cameras.

Another object of this invention is to minimize power consumption in an electronic camera for those periods when a user is not ready to electronically "photograph" an image.

A further object of this invention is to facilitate operation of an electronic camera which minimizes fatigue of the user while he initializes the camera to carry out a recording operation.

An additional object of this invention is to provide a relatively simple yet expedient means by which an electronic camera may be initialized to carry out a recording operation.

These and other objects, advantages and features of the present invention will become readily apparent from the ensuing detailed description and the novel features will be particularly pointed out in the appended claims.

In accordance with this invention, an electronic camera of the type having an image pickup device for generating electrical image signals representing an optical image received thereby, a recorder responsive to a record control signal to record the image signals on a magnetic medium, and a shutter release operable to carry out a recording operation includes a standby switch separate from and operable independently of the shutter release for conditioning the recorder to carry out the recording operation upon subsequent operation of the shutter release; and a recording switch actuated by the shutter release for causing a record control signal to be supplied to the conditioned recorder, whereby image signals are recorded on the magnetic medium.

As one aspect of this invention, the operation of the standby switch causes operating energy to be supplied from a suitable source, such as a battery, to a spindle motor included in the recorder for rotating the magnetic medium.

As another aspect of this invention, an auxiliary standby switch is actuated by the shutter release for causing operating energy to be supplied to the spindle motor, thus duplicating the function of the aforementioned standby switch.

As a feature of this aspect, the shutter release comprises a common driving element moveable from a quiescent position to a first position for actuating the auxiliary standby switch and further moveable from the first position to a second position to actuate the recording switch.

As yet another aspect of this invention, the recorder includes a camera control for sensing the rotary speed of the magnetic medium and for enabling image signals to be recorded on that medium in response to the actuation of the recording switch if a predetermined rotary speed is sensed.

As yet another aspect of this invention, the camera includes an optical auto-focus arrangement which is energized in response to the actuation of either the standby switch or the auxiliary standby switch to focus an image on the image pickup device.

BRIEF DESCRIPTION OF THE DRAWINGS

The following detailed description, given by way of example and not intended to be limited solely thereto, will best be understood in conjunction with the accompanying drawings in which.

DETAILED DESCRIPTION OF A PREFERRED EMBODIMENT

Figure 1:
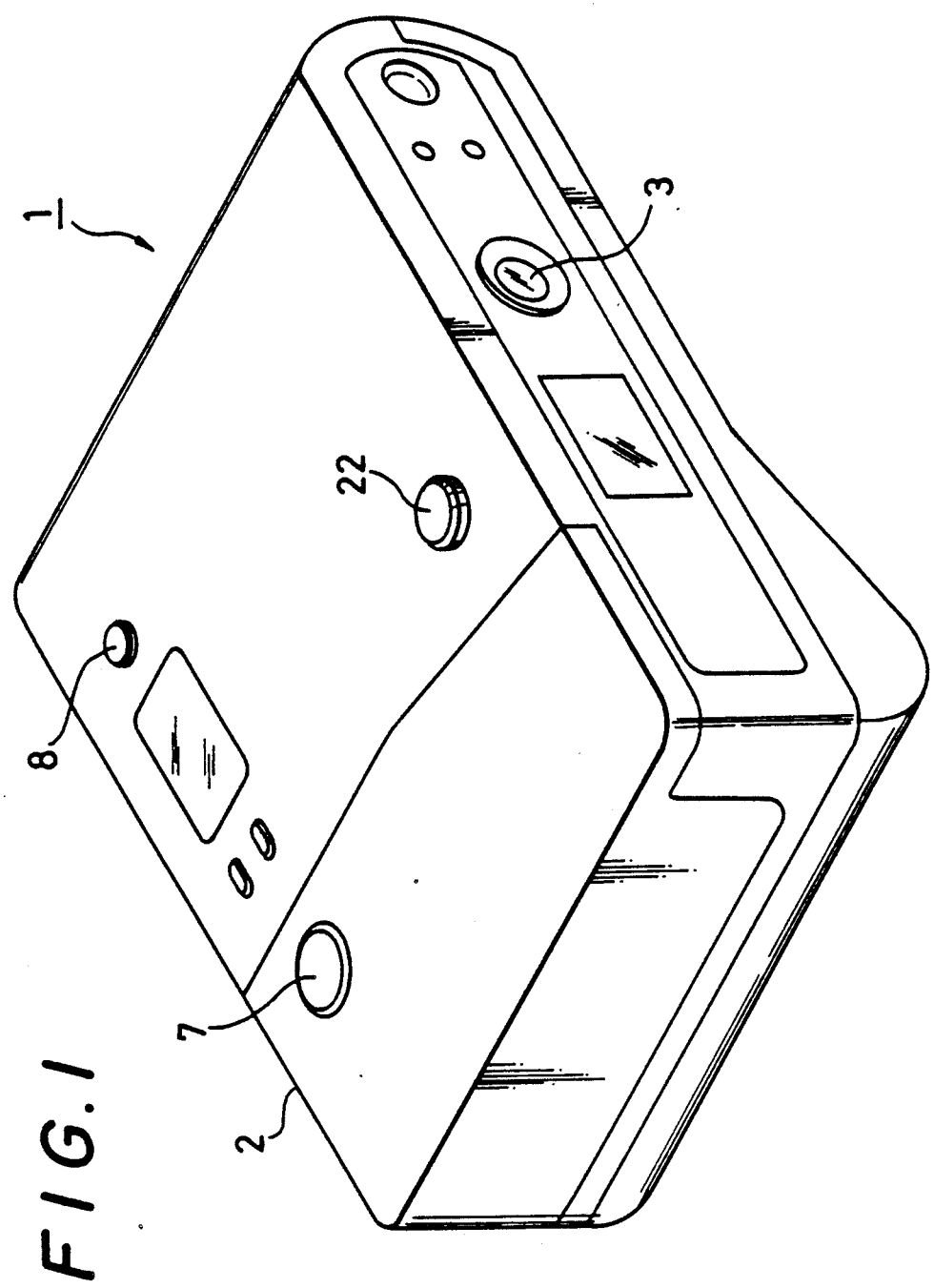
FIGS. 1 and 2 are front and rear perspective views of a preferred electronic still camera.

Referring now to the drawings, wherein like reference numerals are used throughout, FIG. 1 is a perspective view of one embodiment of an electronic still camera 1 adapted to record image signals on a magnetic medium. Camera 1 is provided with an outer casing 2 whose front portion includes an aperture through which a photographic lens 3 may be exposed to an external image or scene to be photographed. The lens may be a motor-driven auto focus lens known to those of ordinary skill in the art.

The front portion of the camera also is provided with an electronic flash unit to irradiate an image to e photographed and a view finder having an objective lens for use by the user. Also provided are a photosensor to sense the quantity of light emitted by the electronic flash unit so as to control that unit accordingly. In addition, a light emitting diode is disposed for use as a self-timer indicator.

On the top of casing 2 is provided a main power switch 22 which also may function as a mode selector to establish a power off mode, a single frame photographing mode and a continuous, or successive frame photographing mode. Switch 22 forms no part of the present invention per se.

A shutter release button 7 is disposed on camera 2 and, as will be described, includes a driving element that may be depressed from a quiescent position to a partially depressed, or first position, and that may be further depressed to a fully depressed, or second position. The partially depressed position of shutter release button 7 serves to initialize camera 1 to condition the camera to carry out a recording operation when shutter release button 7 thereafter is fully depressed.

A standby button 8 also is provided on casing 2 and is adapted, when actuated, to close a standby switch to initialize the camera in the same way as when shutter release button 7 is partially depressed. The manner in which the operating components included in camera 2 respond to shutter release button and to standby button 8 will be described below in conjunction with FIG. 3.

Figure 2:
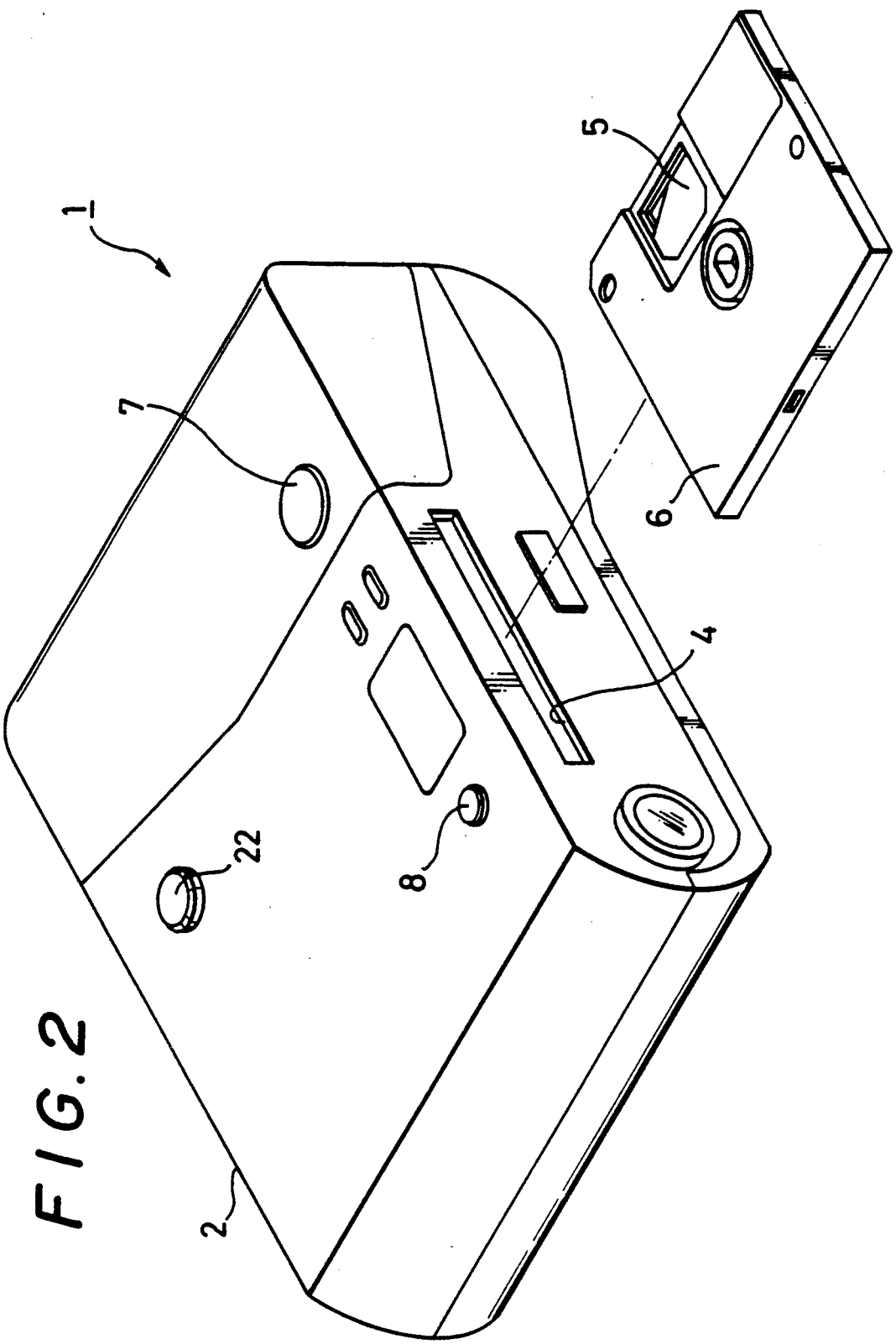

As illustrated in FIG. 2, the rear portion of casing 2 is provided with an insertion port 4, formed as a slit and adapted to receive a magnetic recording medium upon which image signals are recorded. Preferably, the magnetic recording medium is embodied as a magnetic disk 5 housed within a suitable jacket 6 and referred to as a magnetic disk cassette. Jacket, or case 6 is formed of a synthetic resin and, as illustrated, exhibits a generally square, box-like shape.

Magnetic disk 5 is rotatably supported within case 6 by a center core which may be accessed by a spindle within camera 1. Case 6 also is provided with a shutter which, when the cassette is inserted into camera 1, opens to permit a record/playback transducer (also referred to herein as a read/write head) to magnetically contact disk 5.

Figure 3:
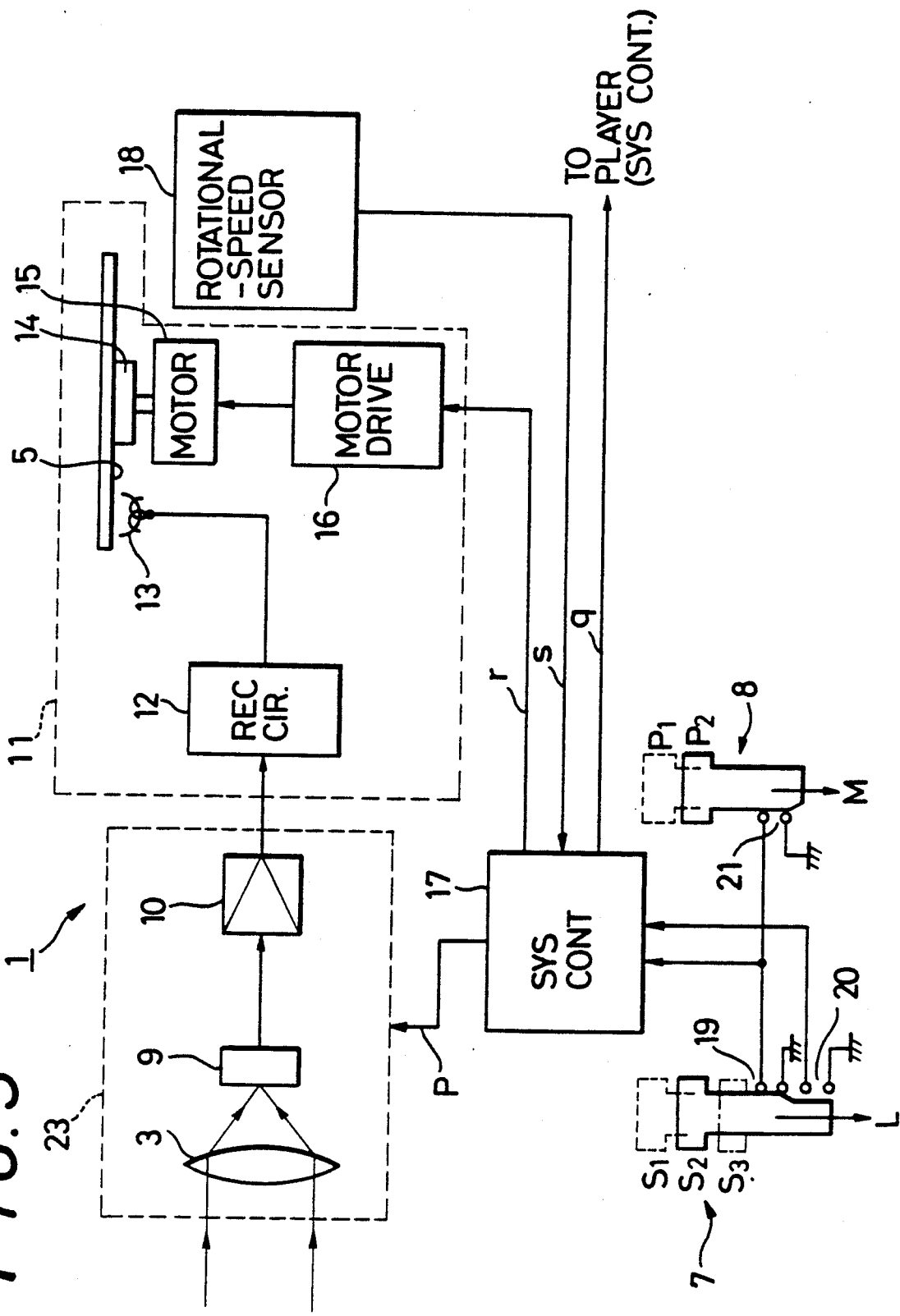
FIG. 3 is a partial block, partial schematic diagram of relevant portions of the camera shown in FIG. 1.

Referring to FIG. 3, a partial block, partial schematic diagram of a portion of camera 1 is illustrated. The illustrated components include an image pickup section 23, an image signal recording section 11, a system controller 17, shutter release button 7 and standby button 8. Image pickup section 23 includes an image sensor 9 adapted to receive an optical image focused thereon by lens 3. Image sensor 9 is adapted to generate electrical image signals representing that image. These image signals are supplied to recording section 11 by way of a suitable amplifier 10, such as an AGC amplifier. Preferably, image sensor 9 is formed as a solid state image pickup device, such as a CCD device. One of ordinary skill in the art will appreciate that the image sensor may, alternatively, be formed as a conventional image pickup tube.

Recording section 11 includes a recording circuit 12 coupled to a magnetic read/write head 13 for processing the amplified image signals received from AGC amplifier 10. Recording circuit 12 may include conventional circuitry, such as a white balance control, gamma-correction circuit, a color difference signal forming circuit, a frequency modulator, an emphasis circuit, and the like. The particular construction and circuit architecture of recording circuit 12 forms no part of the present invention per se. Accordingly, in the interest of brevity, further description of the recording circuit is not provided.

Read/write head 13 is shown in magnetic communication with magnetic disk 5 and is adapted to record on the magnetic disk image signals which have been processed by recording circuit 12. Relative motion is imparted between disk 5 and head 13. In the preferred embodiment, disk 5 is rotatably driven by a spindle 14 mechanically coupled to a spindle motor 15. Motor 15 is coupled to a motor drive circuit 16 which responds to suitable control signals supplied thereto by system controller 17 via conductor r so as to drive motor 15 in a manner that rotates disk 5 at a desired speed suitable for the recording of image signals thereon. A rotational speed sensor 18 is adapted to sense the rotational speed of disk 5 and to supply signals to system controller 17 representative of that speed. Various sensors may be used to detect the rotary speed of the disk, such as Hall elements, optical sensors, or the like. Rotational speed sensor 18 may be disposed so as to sense the rotational speed of motor 15, spindle 14 or disk 5.

Although not shown in FIG. 3, system controller 17 may be coupled to recording circuit 12 to supply a record control signal thereto, thereby enabling the recording circuit to process the image signals supplied thereto from image pickup section 23 for recording by head 13. The system controller is further coupled to the image pickup section by way of a conductor p to read out a field or frame of image signals from sensor 9 to amplifier 10. If sensor 9 is formed as a CCD device, the control signal supplied thereto by system controller 17 reads out a field or frame of image signals to recording circuit 12.

System controller 17 also is coupled by means of one or more conductors q to a similar system controller disposed in an electronic player that may be connected to camera 1 for playing back and displaying the image signals which are recorded on disk 5. One example of such an electronic player and the cooperation between the system controller therein and the system controller located in camera 1 is described in co-pending application Ser. No. 407,147, filed Sept. 14, 1989, and having a common assignee herewith.

Shutter release button 7 is schematically illustrated as being comprised of a driving element movable from a quiescent position $S_1$ to a first position $S_2$, and further movable from the first position $S_2$ to a second position $S_3$. Preferably, first position $S_2$ corresponds to a partially depressed condition of shutter release button 7 and second position $S_3$ corresponds to a fully depressed condition of the shutter release button. Switches 19 and 20 are actuated when the common driving element moves to positions $S_2$ and $S_3$, respectively.

As schematically represented, each of switches 19 and 20 is comprised of a pair of fixed contacts, and the common driving element of shutter release button 7 is comprised of a conductive shunting member adapted to connect, or close, the fixed contacts of switches 19 and 20 when that member is depressed to positions $S_2$ and $S_3$, respectively. In one embodiment, a reference potential, such as ground, is coupled to one contact of switch 19 and also to one contact of switch 20. When switch 19 is closed, that is, when its contacts are connected by means of the common driving element, a logic low signal is supplied to an input of system controller 17 coupled to switch 19. When the driving element is further depressed to position $S_2$, a logic low signal is supplied to another input of the system controller which is coupled to switch 20. Preferably, switch 19 remains closed when the driving element is fully depressed to close switch 20.

Whereas shutter release button 7 is schematically illustrated as a three position switch exhibiting a quiescent position $S_1$, a first position $S_2$ and a second position $S_3$, standby button 8 is formed as a two position switch movable between a quiescent position $P_1$ and an active position $P_2$. A standby switch 21, which may be similar to switch 19, is shown as having two fixed contacts, one of which is coupled to ground potential, which are closed, or connected, by a conductive sheenting member when standby button 8 is depressed to its active position $P_2$. When switch 21 is closed, a logic low signal is supplied to the first mentioned input of system controller 17. That is, the logic low signal is supplied to the same input of the system controller as when switch 19 is closed.

For the purpose of the present description, switch 19 may be thought of as an auxiliary standby switch because it is effectively connected in parallel with standby switch 21. Switch 20 may be thought of as a recording switch.

In the preferred embodiment, when either standby switch 21 or auxiliary standby switch 19 is closed, the logic low signal supplied thereby to system controller 17 results in an initializing or conditioning operation. That is, the system controller supplies to motor drive circuit 16 a signal whereby the motor drive circuit energizes motor 15 to initiate the spinning of disk 5. For example, the motor drive circuit may supply operating energy from a suitable source, such as the camera battery (not shown), to motor 15. As disk 5 rotates, its rotational speed is detected by speed sensor 18 and a speed indicating signal is returned to system controller 17, as by conductor s. As will be described, the system controller inhibits an image signal recording operation from being carried out unless and until disk 5 has been brought up to a proper rotational speed, as detected by sensor 18.

Although not shown herein, system controller 17 may respond to the closure of either standby switch 21 or auxiliary standby switch 19 to supply operating potential from, for example, the camera battery, to recording circuit 12 and to image pickup section 23, thereby conditioning these components to carry out an image signal recording operation once recording switch 20 is closed. Thus, when the standby switch or auxiliary standby switch is closed, motor 15 is driven and, preferably, brought up to proper speed, and recording circuit 12 and image pickup section 23 are conditioned for a subsequent image recording operation. Thus, camera 1 is initialized and is disposed in a "ready" state for the immediate recording of image signals.

When recording switch 20 is closed, the logic low signal supplied thereby to system controller 17 enables the conditioned image pickup section 23 to read a field or frame of image signals from sensor 9 to recording circuit 12 and, further, the conditioned recording circuit now supplies processed image signals to head 13 for recording on disk 5. However, as mentioned above, this recording operation is inhibited if sensor 18 does not detect that disk 5 is rotating at a speed sufficient to carry out the image recording operation.

Although not shown in FIG. 3, if lens 3 includes an auto focusing lens, such as a motor-driven focusing arrangement, the initial conditioning of motor 15, that is, the driving of the motor to rotate disk 5 when standby switch 21 or auxiliary standby switch 19 closed, is accompanied by an automatic focusing of the lens. Likewise, if an automatic iris control is provided in camera 1, the aperture determined thereby also is effected when the standby switch or the auxiliary standby switch is closed. Thus, camera 1 is made ready to "photograph" a properly focused scene. Subsequently, when recording switch 20 is closed, as when shutter release button 7 is fully depressed, image signals are recorded by head 13 in a track on disk 5. It is seen that several fields or frames of image signals may be recorded in plural concentric tracks, thus, representing several individual "photographs".

The parallel connection of standby switch 21 and auxiliary standby switch 19 obviates the need for the user to maintain shutter release button 7 in its partially depressed position to initialize, or prepare camera 1 for a recording operation. Rather, the conditioning of the camera to record image signals may be achieved simply by closing standby switch 21.

Figure 4:
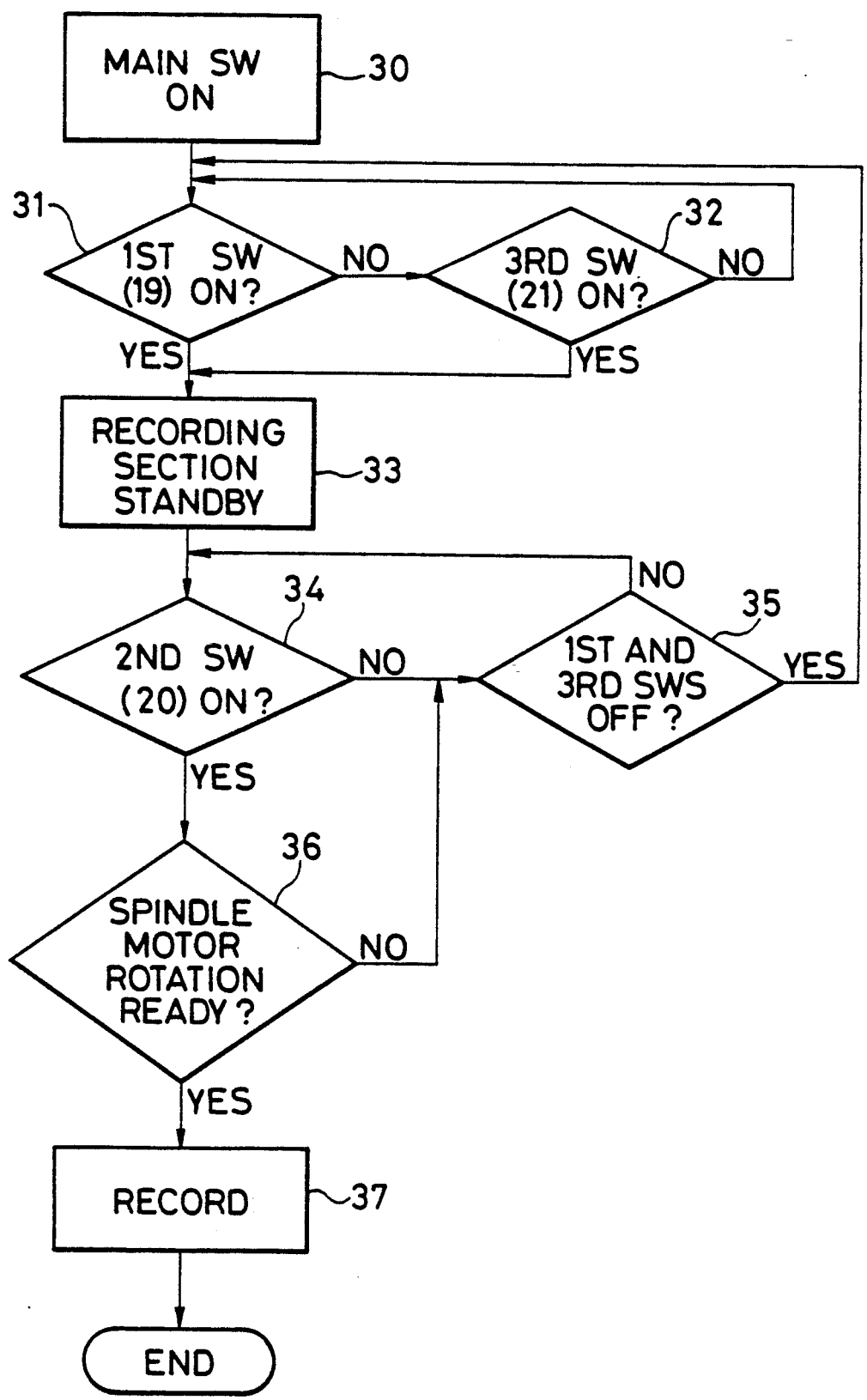
FIG. 4 is a flow chart representing the operation of a microprocessor which may be included in the camera.

In the preferred embodiment of the present invention, system controller 17 includes a microprocessor, such as an Intel model 8088. The manner in which such a microprocessor may be programmed to carry out the aforedescribed conditioning and recording operations now will be described in conjunction with the flow chart shown in FIG. 4.

The routine carried out by the microprocessor is initiated when main switch 22 is turned on, as represented by instruction 30 shown in the flow chart. The routine then advances to inquiry 31 to determine if auxiliary standby switch 19 is closed. If this inquiry is answered in the negative, the routine advances to inquire, at 32, if standby switch 21 is closed. If both of these switches are open, the routine simply cycles through the loop formed of inquiries 31 and 32, as illustrated.

However, if either standby switch 21 or auxiliary standby switch 19 is closed, one of these inquiries is answered in the affirmative and the routine advances to instruction 33 to condition recording section 11 such that an image recording operation subsequently may be performed. That is, recording section 11, as well as image pickup section 23 are initialized. Camera 1 thus is placed in a "ready" or standby mode awaiting the closure of recording switch 20.

Following this initializing step, the routine advances to inquiry 34 to determine if recording switch 20 is closed. If this inquiry is answered in the negative, the routine advance to inquire, at 35, if both standby switch 21 and auxiliary standby switch 19 are open. If inquiry 35 is answered in the affirmative, the routine returns to inquiry 31 to re-initiate the program. Thus, if none of switches 19, 20 and 21 is closed, camera 1 merely returns to its quiescent condition which normally is assumed after main switch 22 is actuated.

However, if inquiry 34 is answered in the negative but either or both of standby switch 21 and auxiliary standby switch 19 is/are closed, inquiry 35 is answered in the negative. As a result, the routine simply cycles through the loop formed of inquiries 34 and 35, as illustrated. If, while cycling through this loop both of the standby switches are open, the routine returns to inquiry 31, whereby camera 1 resumes its quiescent condition.

If recording switch 20 is closed while the routine cycles through the loop formed of inquiries 34 and 35, that is, if the recording switch is closed while camera 1 is in its ready or standby mode, inquiry 34 is answered in the affirmative. Inquiry 36 then is made to determine if disk 5 is rotating at a speed sufficient for the proper recording of image signals. It is recalled that the rotary speed of disk 5, or, alternatively, the rotary speed of spindle motor 15, is detected by rotational speed sensor 18. Thus, if sensor 18 supplies the microprocessor with a signal representing that the rotational speed of the disk is sufficient, inquiry 36 is answered in the affirmative. However, if the disk has not yet been brought up to speed at the time that recording switch 20 is closed, inquiry 36 is answered in the negative and the routine now returns to inquiry 35. It is appreciated that the routine cycles through the loop formed of inquiries 34, 36 and 35 until the speed of disk 5 is detected as being sufficient for an image recording operation. At that time, inquiry 36 is answered in the affirmative and the microprocessor advances to instruction 37 by which image pickup section 23 and recording section 11 are enabled to carry out the recording operation. The microprocessor then exits this routine.

While the present invention has been particularly shown and described with reference to a preferred embodiment, it will be readily appreciated by those of ordinary skill in the art that various changes and modifications may be made without departing from the spirit and scope of the invention. For example, shutter release button 7 need not be configured simply as depressible push button. Other multi-position switching devices known to those of ordinary skill in the art may be used. Similarly, standby switch 21 need not be actuated solely by a push button mechanism. Other plural position drive elements may be used.

As yet another alternative, while magnetic medium 5 preferably comprises a magnetic disk, other suitable recording media may be used, such as a movable sheet, tape or the like.

It is intended that the appended claims be interpreted as including the embodiment specifically described herein, the aforementioned alternatives and all other equivalents there to.

What is claimed is:

1. In an electronic still camera of the type having image pickup means for receiving an optical image and generating electrical image signals representative thereof, and recording means responsive to a record control signal for recording the image signals on a magnetic medium and which includes a transducer and a spindle motor operable by operating energy from a source thereof for rotatably driving said magnetic medium relative to said transducer; the combination of first standby switch means actuable for causing said operating energy to be supplied from said source to said spindle motor so as to rotate said magnetic medium and thereby enable said recording means for recording of said image signals on said magnetic medium, second standby switch means actuable independently of said first standby switch means for causing said operating energy to be supplied from said source to said spindle motor and thereby also enabling said recording means, recording switch means actuable for causing said record control signal to be supplied to said recording means after enabling thereof by actuation of one of said first and second standby switches for said recording of the image signals on said magnetic medium, and shutter release means including a common driving element movable from a quiescent position to a first position for actuating one of said first and second standby switch means and further movable from said first position to a second position to actuate said recording switch means.

2. An electronic still camera as in claim 1 wherein said recording means further includes camera control means for sensing the rotary speed of said magnetic medium and for enabling image signals to be recorded on said magnetic medium in response to the actuation of said recording switch means if a predetermined rotary speed is sensed.

3. In an electronic still camera of the type having image pickup means for receiving an optical image and generating electrical image signals representative thereof, recording means responsive to a record control signal for recording the image signals on a magnetic medium, and shutter release means operable to carry out a recording operation whereby the image signals are recorded on said magnetic medium, the combination of standby switch means separate from and operable independently of said shutter release means for enabling said recording means to carry out said recording operation upon subsequent operation of said shutter release means, recording switch means actuated by said shutter release means for causing a record control signal to be supplied to the enabled recording means, said recording means including a selectively enabled recording circuit for processing image signals for recording on said magnetic medium, said shutter release means including a common driving element movable from a quiescent position to a first position and further movable from said first position to a second position, auxiliary standby switch means actuated when said driving element is moved to said first position for enabling said image pick up means and said recording circuit to generate and record image signals, and said recording switch means being actuated when said driving element is moved to said second position for causing said recording means to record said image signals, and said standby switch means alternatively operates to enable said image pickup means and said recording circuit to generate and record image signals.

4. An electronic still camera as in claim 3; further comprising optical auto focus means responsive to the actuation of said standby switch means or said auxiliary standby switch means for focusing an image on said image pickup means.

* * * * *